Patented Jan. 4, 1949

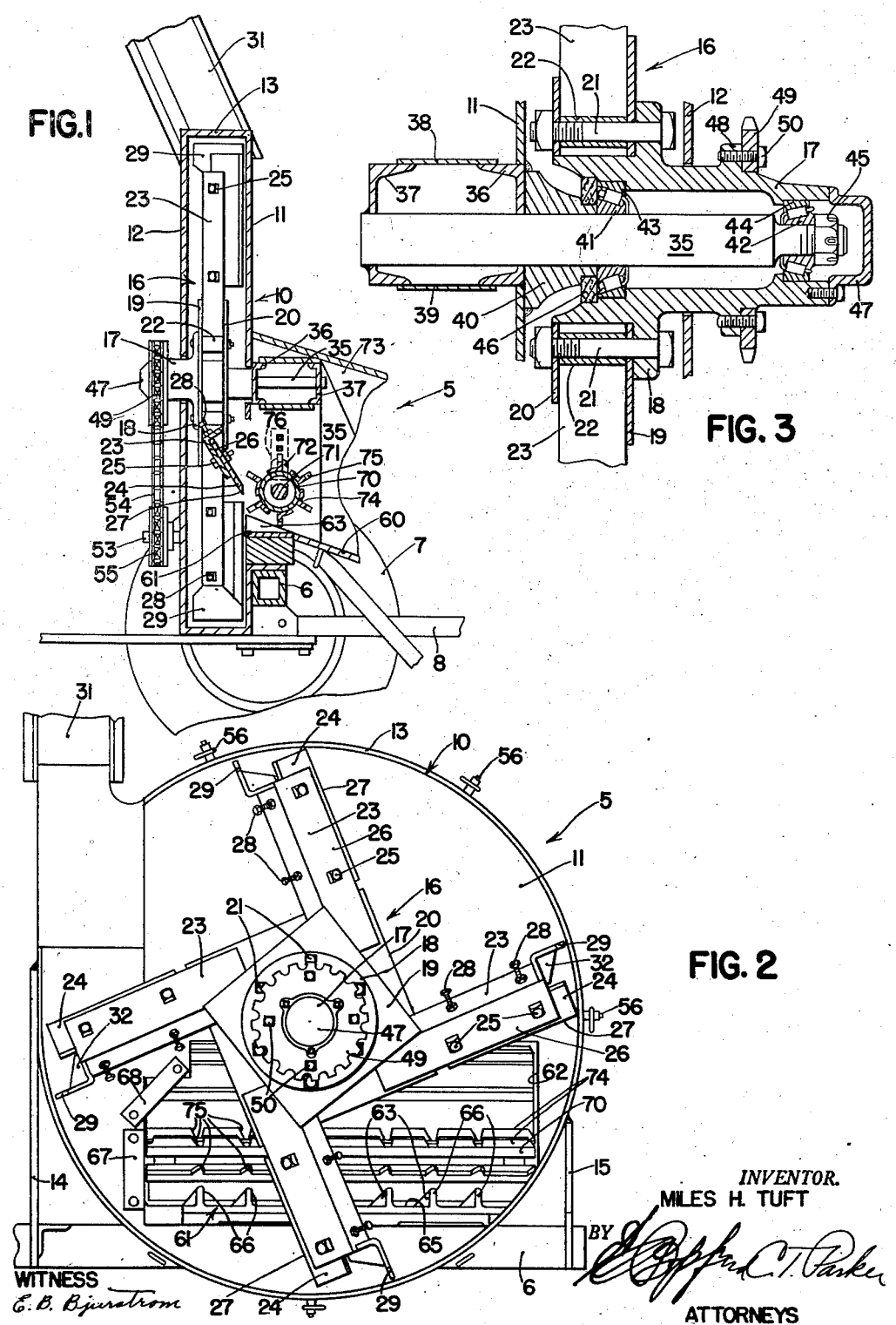

2,457,951

UNITED STATES PATENT OFFICE 2,457,951

ROTARY FEED CUTTER WITH SHEAR BAR ARRANGED ON A CHORD

Miles H. Tuft, Lancaster, Calif., assignor, by mesne assignments, to Deere Manufacturing Co., a corporation of Iowa Original application May 11, 1942, Serial No. 442,563. Divided and this application August 30, 1944, Serial No. 551,933

14 Claims. (Cl. 146—112)

The present invention relates generally to feed cutters and the principal object of this invention relates to the provision of a feed cutter of appreciably increased capacity, without a proportional increase in size and weight of the machine, and which is simple in construction and durable in operation.

This application is a division of my application, Serial No. 442,563, filed May 11, 1942.

A more specific object relates to the provision of a novel and improved feed cutter of the type comprising a cutter head of the flywheel type, having a plurality of cutting knives extending generally radially outwardly from the axis of rotation, the cutting edges of the knives being disposed substantially in a plane perpendicular to the axis. A conventional feed cutter of this type comprises a generally circular housing disposed vertically, within which is rotatably disposed a flywheel type cutter. Crops are fed to the rotary cutter through a feed opening in the housing on one side of the axis of rotation, and a relatively stationary cutter bar or shear member is mounted along the lower edge of such opening, substantially on a level with the axis of rotation of the cutter. The cutter rotates in such a direction that the knives travel downwardly against the shear member, cutting the crop which is fed through the feed opening and discharging the latter by centrifugal force through a discharge opening extending tangentially from the opposite side of the housing. The rotor is rotated at such a high speed that the limitation in capacity is determined by the size of the feed opening, which is determined by the length of the shear bar between the rotor shaft and the periphery of the housing, or in other words, by the radius of the circular housing. Therefore, a more specific object of my invention relates to the provision of a cutter of the class described having a shear member which is longer than the radius of the housing and of the flywheel type cutter. This object is accomplished by locating the shear member and feed opening in vertically spaced relation to the axis of rotation so that the cutter bar or shear member extends across the entire housing as a chord of the latter.

It will be evident to those skilled in the art, however, that with a conventional straight cutter bar and a plurality of knives on the rotor which extend exactly radially from the axis of rotation, there will be no shearing effect of the knife against the cutter bar over a substantial portion of the latter, due to the fact that the knife moves downwardly over a portion of the cutter bar and then moves upwardly relative to the remainder of the cutter bar without accomplishing any cutting action in the last part of the range. Hence, it is a further object of my invention to provide a flywheel type cutter and shear member which is longer than a radius of the rotary cutter, in which assembly provision is made for producing a cutting action between the rotor and the shear member over substantially the entire length of the latter.

In the accomplishment of this object, the shear member is provided with a plurality of laterally spaced ridges extending transversely of the shear member, and terminating in substantially vertical cutting edges disposed in a common plane with the main horizontal cutting edge of the shear member. The rotor knives are not disposed exactly radially, but are positioned with the outer ends in slightly trailing relation, with the result that the portion of the shear member over which the blade moves downwardly is substantially increased. Furthermore, by virtue of the vertical cutting edges spaced along the shear bar, a shearing action is obtained across the entire length of the shear member.

A further object has to do with the provision of a novel feed roll, which is disposed over the shear member and is vertically shiftable to accommodate variable amounts of crop material fed over the shear member, and a related object has to do with providing notches or grooves in the feed roll adapted to receive the ridges on the shear member, and thus permit the feed roll to approach the shear member to a distance less than the height of the ridges. This permits a close control of the material as it passes over the shear member to the cutting edges and provides for holding the material against the shear member during the cutting operation.

A still further object of the invention relates to the provision of a flywheel type cutter head that is easily and readily removable from the machine for facilitating repair and maintenance thereof.

These and other objects and advantages of my invention will be apparent to those skilled in the art after a consideration of the following description, in which reference is had to the drawings appended hereto, in which Figure 1 is a sectional elevational view taken through a feed cutter embodying the principles of the present invention.

Figure 2 is a rear elevational view of the feed cutter, with the rear wall of the housing removed, and drawn to a larger scale.

Figure 3 is an enlarged sectional elevational view showing the details of construction of the bearing support for the rotatable cutter head.

Referring now to the drawings, the feed cutter is indicated in its entirety by reference numeral 5 and comprises a supporting frame including a main transverse axle beam 6 mounted on a pair of laterally spaced supporting wheels, one of which is indicated at 7 in Figure 1. The machine is transported through the fields by means of a draft member 8, which can be connected to a tractor or the like.

The cutting mechanism is contained within a generally circular housing 10 comprising a front wall 11, a back wall 12 and a substantially cylindrical wall 13 interconnecting the front and back walls 11, 12 and extending peripherally around the housing. The front wall 11 is fixed as by welding to the rear of the transverse main beam 6, and additional support for the housing is provided by a pair of laterally spaced brackets 14, 15 which are likewise welded to the transverse beam 6.

A rotary flywheel type cutter head 16 is disposed within the housing 10 and comprises a hub casting 17 having a radial flange 18, to which a pair of axially spaced plates 19, 20 are secured by bolts 21. The plates 19, 20 are spaced apart by tubular spacers 22 through which the bolts 21 pass. Positioned between the plates 19, 20 and welded thereto along their contacting edges, are four blade holding angle irons 23 which are disposed in angularly spaced relation to each other extending outwardly from the hub member 17. The angle iron supports 23 are not exactly radial with respect to the radius of rotation but are tangent to a circle having its center on the axis of rotation, each of the members 23 being disposed substantially perpendicular to the adjacent members 23. The edges of the two flanges of the angle iron members 23 are welded to the front plate 20 while the apex or corner of each member 23 is welded to the rear plate 19.

The cutter head 16 rotates in a clockwise direction as viewed in Figure 2 and the cutting elements are in the form of blades 24, which are secured by bolts 25 to the inside surfaces of the leading flanges 26 of the angle irons 23. The outer edge of each blade 24 is beveled to provide a cutting edge 27, the cutting edges 27 of the blades being disposed in a common vertical plane substantially perpendicular to the axis of rotation. Each of the blades 24 is adjustable inwardly and outwardly on its supporting flange 26 to enable the blade edges to be aligned in the common plane and this adjustment is secured by means of a pair of set screws 28 which extend through threaded apertures in the trailing flange of each angle iron support 23 and bear against the back edge of the knife blade 24. A suitable lock nut locks the set screw in adjusted position. A paddle 29 is fixed at the outer end of each of the angle irons 23 in close proximity to the inner surface of the cylindrical wall 13. These paddles 29 engage the crop material cut by the blades 24 and propel the material around the inner surface of the cylindrical wall 13 and through a discharge duct 31 disposed substantially tangent to the housing 10 and in communication therewith. A rotary flywheel cutter of this general type is shown and claimed in Patent No. 2,313,872 granted to Hill, March 16, 1943, to which reference may be had for a more complete description of the blade adjusting means. The paddles 29 are braced by reenforcing gussets 32 to withstand the impact of the cut material while the cutter is rotating at high speed.

The rotor 16 is rotatably supported on a fore and aft extending dead spindle 35, which extends through the front wall 11 of the housing 10 and through aligned holes in a pair of transversely disposed channel beams 36, 37, which are supported by suitable means (not shown) on the main supporting beam 6. The spindle 35 is welded to the front channel beam 37 and the two channels 36, 37 are interconnected by upper and lower plates 38, 39 which are welded to the top and bottom flanges, respectively, of the channel beams to form a rigid box beam of great strength for supporting the spindle 35 and the cutter head 16. An annular spacer 40 is mounted on the spindle 35 and is welded to the back of the rear channel beam 36 and to the front housing wall 11. The hub 17 is journaled on a pair of axially spaced roller bearings 41, 42, the outer races of which are pressed into recesses 43, 44, respectively, in the hub casting 17, while the inner races are mounted on the spindle 35. The inner race of the front bearing 41 bears against the end of the annular spacer 40 and the bearings are secured on the spindle 35 by means of a nut 45 which is threaded onto the end of the spindle and bears against the inner race of the rear bearing 42. An oil seal 46 in front of the bearing 41, and a cap 47, bolted to the end of the hub casting 17, protect the bearings against dust and retain lubricant within the bearing enclosure. The rear end of the hub 17 projects through an opening in the back wall 12 of the cutter housing and is provided with a radial flange 48 to which a sprocket 49 is fixed by bolts 50.

The cutter head 16 is driven from a power shaft 53 by means of a drive chain 54 which is trained over the sprocket 49 and over a driving sprocket 55 which is fixed to the shaft 53. The shaft 53 extends forwardly at one side of the housing 10 and receives power from the tractor by means which is disclosed in the above-identified co-pending application.

From the foregoing description, it will be evident that the cutter head 16 can be quickly and easily removed from the spindle 35 after the rear wall 12 of the housing has been removed, by removing the end cap 47 from the hub 17 and unscrewing the nut 45, after which the entire cutter head can be slipped rearwardly off the end of the spindle 35. The rear wall is detachably secured to the peripheral wall 13 by means of a plurality of circumferentially spaced hook bolts 56.

The crop is delivered to the rotary cutter 16 over an upwardly and rearwardly inclined harvester platform 60, by suitable crop conveying mechanism shown and described in the above-identified co-pending application, but since such mechanism does not constitute an essential part of the present application, it is not included in this description. A relatively stationary shear member 61 is disposed transversely and is mounted on top of the main beam 6 in an opening 62 provided in the front wall 11 of the cutter housing for passage of the crop material into the latter. The top of the shear member 61 is flat and horizontal and has a plurality of substantially pyramid-shaped fore and aft extending ridges 63 disposed thereon, each of the ridges being inclined upwardly and rearwardly toward the rear edge of the shear member 61. The shear member. 61 and the feed opening 62 coextensive therewith, are disposed beneath the fore and aft extending axis of the rotary cutter 16, so that the shear member is disposed near the bottom of the circular housing 10 and extends transversely across the latter as a chord of the circular housing 10. By virtue of this position of the shear member, the blades 24 of the rotor move downwardly across the rear cutting edge 65 of the shear member 61, at the right hand side of the latter, but as the blades continue their circular path, they move across the shear member at an increasingly greater angle thereto so that as the blades approach the left hand end of the shear member 61 they are moving substantially parallel to the shear member.

The cutting edges 27 of the blades 24 are not exactly radially disposed with respect to the axis of rotation of the cutter 26, but as pointed out hereinbefore, the blade edges 27 are disposed tangent to a circle having the axis of rotation as its center, so that the outer ends of the blades 24 trail behind a true radial position. This has the effect of prolonging the shearing action between the cutting edges 27 of the blades 24 and the horizontal rear edge 65 of the shear member 61, over a greater portion of the edge 65, but nevertheless there is very little cutting accomplished between these two cutting edges at the extreme left hand end of the shear member 61. However, each of the ridges 63 terminates in the vertical plane of the rear edge 65 of the shear member 61, providing a series of laterally spaced vertical cutting edges 66 along the right-hand rear edges of the ridges 63. Thus, the ridges 63 prevent the crop material from sliding along the length of the shear member, and the cutting action takes place in a series of working portions, each of which comprises the horizontal cutting edge 65 of the shear member 61 between two adjacent ridges 63 and the vertical cutting edge 66 along the side of one of the ridges. Hence, at the right-hand end of the shear member, the horizontal edge 65 does most of the cutting because of the downward sweep of the cutter knives 24, while at the left-hand end of the shear member the vertical edges 66 do most of the cutting because of the horizontal sweep of the cutter knives.

Two additional ledger plates 67, 68 are fixed to the front wall 11 of the housing along the left-hand edge of the opening 62, and these cooperate with the knife blades 24 to cut up any material that is not cut by the edges 65, 66 of the shear member. As shown in Figure 2, the plate 67 is mounted with its cutting edge substantially vertical, while the plate 68 has its cutting edge disposed substantially at 45 degrees in an inwardly and upwardly inclined position.

The crop material is fed to the cutting edges by means of a feed roll 70, which is mounted on a transversely disposed drive shaft 71 extending outwardly through vertical slots 72 in the side walls 73 of the harvester platform 60. Fixed to the feed roll 70 is a plurality of angle iron ribs 74 which extend axially of the feed roll 70 and have radially extending flanges which are notched at 75 to receive the upper edges of the ridges 63, whereby the outer edges of the ribs 74 are enabled to pass below the tops of the ridges in intermeshing relation. This not only provides a more positive feed for the crop material, but also prevents the passage of comparatively large stones into the cutter mechanism where they might cause damage.

The feed roll 70 is free to move upwardly and downwardly with respect to the shear member to accommodate varying amounts of crop material fed to the cutter. This vertical movement is provided for by virtue of the vertical slots 72 in the side walls, but a vertically adjustable stop bar 76 is attached to the outer side of each of the side walls 73 and serves to engage the feeder roll shaft 71 to limit the extent of upward movement thereof. It has been found that any stones which are small enough to pass between the ridges 63, do not cause serious damage to the cutting edges of the cutter mechanism, but the larger stones which bridge between two adjacent ridges 63, cause the feed roll 70 to rise into engagement with the stop bars 76, thereby preventing the stone from passing between the ribs 74 and the ridges 63.

During operation, power is supplied through the shaft 53 and the chain 54 to drive the cutter head 16 in a clockwise direction as viewed in Figure 2. The feed roll 70 is driven by a suitable means (not shown) in a clockwise direction as viewed in Figure 1, feeding the crop material over and between the ribs 63 to the knives 24. The edges 27 of the latter cooperate with the horizontal and vertical cutting edges 65, 66 of the shear member 61 to shear the crop material, and any of the latter which is not cut by the above-mentioned cutting edges, is sheared by the knives 24 against the ledger plates 67 and 68. The sheared crop material is engaged by the paddles 29 on the ends of the arms 23 and thrown by centrifugal force upwardly through the discharge conduit 31, which conducts the chopped material to any suitable receptacle (not shown).

I claim:

1. In a rotary cutting machine of the class described, the combination of a relatively stationary shear member having a cutting edge along one side thereof, said shear member having a plurality of laterally spaced ridges extending generally transversely of said cutting edge along the surface which receives the material to be cut, and a feed roll disposed adjacent said cutting edge and generally parallel thereto and spaced away from said material receiving surface to provide for passage of material between said roll and said surface toward said cutting edge but spaced therefrom a distance less than the height of said ridges, said roll being notched to receive the latter in intermeshing relation.

2. In a rotary cutting machine of the class described, the combination of a relatively stationary shear member having a cutting edge along one side thereof, said shear member having a plurality of laterally spaced ridges extending generally transversely of said cutting edge along the surface which receives the material to be cut, and a feed roll disposed adjacent said cutting edge and generally parallel thereto and shiftable toward and away from said material receiving surface to provide for passage of variable amounts of material therebetween, said roll being notched to receive said ridges in intermeshing relation when said roll approaches in close proximity to said surface.

3. In a rotary cutting machine of the class described, the combination of a relatively stationary shear member having a main cutting edge along one side thereof, said shear member having a plurality of laterally spaced ridges extending generally transversely of said cutting edge along the surface which receives the material to be cut, said ridges terminating in cutting edges disposed in a plane with said main cutting edge and in angular relation therewith, a rotary chopping member having cutting edges movable substantially in said cutting edge plane, and a feed roll disposed adjacent said cutting edges and spaced from said material receiving surface to provide for passage of material between said roll and said surface toward said cutting edge but spaced therefrom a distance less than the height of said ridges, said roll being notched to receive the latter in intermeshing relation.

4. In a rotary cutting machine of the class described, the combination of a relatively stationary shear member having a generally horizontal cutting edge along one side thereof, said shear member having a plurality of laterally spaced ridges disposed on top of said shear member and extending transversely of said cutting edge, said ridges terminating in generally vertical cutting edges rising from said horizontal cutting edge and in a common plane with the latter, a rotary chopping member having cutting edges movable substantially in said common plane, and a feed roll disposed adjacent said cutting edges and above said shear member, said feed roll being shiftably mounted to provide for vertical movement of said roll toward and away from said shear member to provide for passage of variable amounts of material there between, said roll being notched to receive said ridges in intermeshing relation when said roll approaches in close proximity to said surface.

5. A crop cutting machine of the class described comprising a rotary cutter head having at least one knife blade fixedly mounted thereon so that the cutting edge thereof travels in a plane as the head rotates, a stationary shear member cooperatively associated with said knife blade, said shear member being spaced radially from the axis of rotation of the cutter head and disposed with its length perpendicular to a radius drawn through said axis, and a plurality of working portions on said shear member, each of said portions including a first cutting edge extending lengthwise with respect to the shear member and a second cutting edge disposed at an angle to said first cutting edge, whereby the material being cut is held by said second cutting edges against appreciable movement along the length of the shear member, and a feed roll rotatably disposed adjacent said cutting edges but spaced therefrom sufficiently to pass therebetween the material to be cut, said feed roll having a surface generally complementary to the surface of said shear member adapted to intermesh with said working portions of the latter to hold the material against said cutting edges in close proximity to said cutter head.

6. A crop cutting machine of the class described comprising a rotary cutter head, a plurality of knife blades fixed to the cutter head tangent to a circle described about the axis of rotation of the cutter head as a center, the cutting edges of said blades being disposed in a common plane, a stationary shear member cooperatively associated with said cutter head, said shear member describing a chord through the circular path traveled by the outer ends of the knife blades, and a plurality of working portions on said shear member, each of said working portions comprising a pair of cutting edges disposed in a plane parallel to and closely adjacent the plane of the cutting edges of said knife blades, one of said edges extending in a lengthwise direction with respect to the shear member and the other edge being perpendicular to said one edge and extending generally toward axis of rotation of the cutter head, and a feed roll rotatably disposed in close proximity to said cutter head and cooperable with said shear member to pass crops therebetween to said cutting edges, said feed roll intermeshing with said working portions of said shear member and having an axially extending surface and a radially extending surface disposed substantially parallel to said pair of perpendicular cutting edges, respectively.

7. A crop cutting machine of the class described comprising a rotary cutter head, a plurality of knife blades fixed to said cutter head with their cutting edges disposed substantially in a common radial plane, a shear member positioned to one side of the axis of rotation of the cutter head, a cutting edge on said shear member disposed substantially in the plane of the knife blade edges, a plurality of ridges formed on the side of said shear member adjacent the axis of rotation of the cutter head, said ridges extending substantially perpendicular to the cutting edge of the shear member and the ends of the ridges being disposed in the plane of the cutting edge, cutting edges formed on the ends of the ridges cooperative with said knife blades, and a feed roll journaled for rotation about an axis substantially parallel to the longitudinal axis of the shear member, said feed roll having radially extending ribs notched to receive said ridges, whereby the radially outer edges of the ribs are enabled to pass below the tops of the ridges.

8. A crop cutting machine of the class described comprising a rotary cutter head journaled for rotation about a horizontal axis, a plurality of knife blades fixed to said cutter head with their cutting edges disposed in a common plane perpendicular to said axis, a horizontally disposed shear member positioned below the axis of the cutter head, a horizontal cutting edge on said shear member disposed substantially in the plane of the knife blade edges, a plurality of substantially pyramid-shaped ridges formed on the top surface of the shear member and extending generally perpendicular to the longitudinal axis of the shear member, the ends of said ridges having vertical cutting edges formed thereon cooperative with said knife blades, and a feed roll disposed above said ridges and journaled for rotation about an axis substantially parallel to the longitudinal axis of the shear member, said feed roll having radially outwardly extending crop-engaging ribs, and said ribs being notched so as to clear said ridges and permit the radially outer edges of the ribs to pass below the tops of the ridges.

9. In a rotary cutting machine of the class described, the combination of a generally circular vertically disposed housing adapted to receive a flywheel type cutter head rotatable about a central horizontal axis, a generally horizontal shear member mounted on one wall of said housing in vertically spaced relation to the center of said housing and appreciably longer than a radius of the latter, there being a feed opening in said housing wall above and coextensive with said shear member, the latter having a cutting edge along the inner side thereof and a plurality of laterally spaced ridges on the upper surface extending transversely of said cutting edge terminating in vertical cutting edges rising from said horizontal edge and in a common plane with the latter, and a feed roll disposed adjacent said cutting edges and above said shear member, said feed roll being shiftably mounted to provide for vertical movement of said roll toward and away from said shear member to provide for passage of variable amounts of material therebetween, said roll being notched to receive said ridges in intermeshing relation when said roll approaches in close proximity to said surface.

10. In a rotary cutting machine, the combination of a generally circular vertically disposed housing adapted to receive a flywheel type cutter head rotatable about a central axis, said housing having a feed opening in one wall thereof extending across the housing on one side of said axis, a first stationary shear member mounted along one side of said opening and describing a chord across said housing spaced from said axis and longer than a radius of the housing, and a second shear member disposed substantially in the plane of said first shear member and extending along another side of said opening at an angle to said first shear member.

11. In a rotary cutting machine, the combination of a generally circular vertically disposed housing having a feed opening in one wall thereof extending across the housing beneath the central axis of the latter, stationary shear members extending horizontally along the lower edge of said opening and upwardly along one side edge thereof, and a flywheel type cutter head rotatably disposed in said housing for rotation about said central axis and having at least one cutting blade cooperable with said shear members and movable during rotation of said cutter head in shearing relation with said horizontal shear member toward said upwardly extending shear member and into shearing relation with the latter.

12. In a rotary cutting machine, the combination of a generally circular vertically disposed housing having a feed opening in one wall thereof extending across the housing beneath the central axis of the latter, stationary shear members extending horizontally along the lower edge of said opening and upwardly along one side edge thereof, and a flywheel type cutter head journaled in said housing for rotation about said central axis and having a plurality of knife blades disposed tangent to a circle described about the axis of rotation, the cutting edges of said blades being disposed in substantially the plane of said shear members, said blades being adapted to move downwardly in shearing relation with said horizontal shear member adjacent one end thereof, then moving toward a position perpendicular to said horizontal shear member and into shearing relation with said upwardly extending shear member in generally parallel relation thereto.

13. In a rotary cutting machine, the combination of a generally circular vertically disposed housing adapted to receive a flywheel type cutter head rotatable about a central axis, said housing having a feed opening in one wall thereof extending across the housing underneath said axis, a horizontal stationary shear member mounted along the lower edge of said opening and describing a horizontal chord across said housing below said axis and longer than a radius of the housing, a plurality of ridges formed on the top of said shear member extending transversely of the horizontal cutting edge of said shear member and the ends of said ridges being disposed in the plane of the cutting edge, cutting edges on the ends of said ridges and extending upwardly from said horizontal cutting edge, a second shear member at one end of said horizontal shear member and extending upwardly therefrom along the side of said opening, and a flywheel type cutter head rotatably disposed in said housing on said axis and having cutter blades adapted to move downwardly during operation in shearing relation with said horizontal cutting edge adjacent the other end thereof, then moving laterally toward a position perpendicular to said horizontal shear member, cooperating with said cutting edges on said ridges, and into shearing relation with said second shear member.

14. In a rotary cutting machine, the combination of a generally circular vertically disposed housing adapted to receive a flywheel type cutter head rotatable about a central axis, said housing having a feed opening in one wall thereof extending across the housing underneath said axis, a horizontal stationary shear member mounted along the lower edge of said opening and describing a horizontal chord across said housing below said axis and longer than a radius of the housing, a plurality of ridges formed on the top of said shear member extending transversely of the horizontal cutting edge of said shear member and the ends of said ridges being disposed in the plane of the cutting edge, cutting edges on the ends of said ridges and extending upwardly from said horizontal cutting edge, a second shear member at one end of said horizontal shear member and extending upwardly therefrom along the side of said opening, a flywheel type cutter head rotatably disposed in said housing on said axis and having cutter blades adapted to move downwardly during operation in shearing relation with said horizontal cutting edge adjacent the other end thereof, then moving laterally toward a position perpendicular to said horizontal shear member, cooperating with said cutting edges on said ridges, and into shearing relation with said second shear member, and a feed roll disposed above said ridges and journaled for rotation about an axis substantially parallel to the longitudinal axis of the shear member, said feed roll having radially outwardly extending crop-engaging ribs, and said ribs being notched so as to clear said ridges and permit the radially outer edges of the ribs to pass below the tops of the ridges.

MILES H. TUFT.

REFERENCES CITED

The following references are of record in the file of this patent:

UNITED STATES PATENTS

| Number | Name | Date |
| --- | --- | --- |
| 177,383 | Dick, Jr. | May 16, 1876 |
| 207,757 | Matthews | Sept. 3, 1878 |
| 412,040 | Rahn | Oct. 1, 1889 |
| 460,268 | Ross | Sept. 29, 1891 |
| 864,552 | Perkins et al. | Aug. 27, 1907 |
| 1,328,916 | Fow | Jan. 27, 1920 |
| 1,363,445 | Virtue | Dec. 28, 1920 |
| 1,461,764 | Silver | July 17, 1923 |
| 1,625,194 | Dick | Apr. 19, 1927 |
| 1,663,114 | Clemens | Mar. 20, 1928 |
| 2,313,872 | Hill | Mar. 16, 1943 |